Patented Apr. 7, 1936

2,036,438

UNITED STATES PATENT OFFICE 2,036,438

CLEANING, WETTING, AND EMULSIFYING COMPOSITION

Walther Schrauth, Berlin-Dahlem, Germany, assignor, by mesne assignments, to E. I. du Pont de Nemours & Co., Wilmington, Del., a corporation of Delaware No Drawing. Application December 31, 1930, Serial No. 505,972. In Germany June 18, 1930

11 Claims. (Cl. 87—5)

It is already known that the cleansing efficiency of washing agents especially of soaps may be increased by combining them with solvents of fats (cf. Kunkler, Seifensiederzeitung 31, page 150, 1904). Furthermore it has been found by Livache (Jahresberichte uber die Leistungen der chem. Technologie, 1878, pages 556/557) that hydroxylated organic products can be combined with soaps by the addition of water. Finally it is known, that the most advantageous results within this group are obtained with the hydrogenated products of aromatic phenols, which render soluble with each other various types of chemical substances.

The aforesaid substances can be used in combination with soaps etc. for the purposes indicated to a large extent, but they could not be used hitherto for the general purposes of cleansing, as for instance laundry-work, toilet soaps, etc. because of their penetrating and persistent odor.

Now it has been found in accordance with the present invention that substances such as substituted dihydro-dioxol, which may be obtained without difficulty by condensation of carbonyl-compounds with polyvalent aliphatic alcohols, combined with soaps show the above mentioned properties of hydroxyl substituted hydrocarbons. But they are, in contrast to the hitherto used products, free from odor, and it seems therefore that they can be used for the general purposes of household laundry work without difficulty.

This result was surprising for polyvalent alcohols, as generally products rich in oxygen, do not possess the above mentioned properties and very often the usual addition of such substances, e. g. sugar etc. produces quite other results.

Suitable dihydrodioxols substituted by groups which contain hydroxyl are for example such as the 2,2-dimethyl-4-oxymethyl-dihydrodioxol (cf. B. 28, 1895, page 1169), as well as, in general, compounds obtained by condensing cyclic ketones and multi-valent alcohols. Especially suitable for use are the products obtained by use of cyclic ketones (cyclopentanon, cyclohexanon and its homologues) and glycerin as for example 2,2-pentamethylen-4-oxymethylen-dihydrodioxol (obtained from cyclohexanon-glycerin) or 2,2-methylpentamethylen-4-oxymethyl-dihydrodioxol (obtained from a mixture of the 3 isomeric methylcyclohexanons-glycerin). These products are insoluble in water, but soluble in the presence of soap and make it possible to dissolve hydrocarbons such as benzine, benzene, hydrogenated naphthenes or the like in clear watery solutions. If greater quantities of hydrocarbons are added, emulsions are obtained by diluting with water.

The production of certain of the substances above noted and their constitution is described by R. Stelzner "Literaturregister der organischen Chemie", vol. 1914/15, page 292, last paragraph, and vol. 1919/20/21, page 415, second paragraph. A typical representative of the products is the 2,2-methyl-pentamethylen-4-oxymethyldihydrodioxol, a transparent liquid, which boils at 130–145° under a pressure of 15 mm. of mercury.

Example 1

Equal parts of 2,2-pentamethylen-4-oxymethyl-dihydrodioxol and of 30% potassium oleate soap produce upon mixing, a clear solution. This mixture may be diluted with water to any extent, and in all cases completely odorless clear solutions having excellent washing properties are obtained. By adding a hydrocarbon, such as tetrahydronaphthalene in a quantity equivalent to that of the soap, clear solutions with exceedingly high foaming and fat-solvent properties are produced and by adding larger quantities very stable emulsions are produced.

Example 2

One part of cocoanut oil soap is dissolved on warming in three parts 2,2-(methylpenta-methylen)-4-oxymethyl-dihydrodioxol. This solution is completely clear and miscible with water in any proportion to clear odorless solutions. Such solutions possess remarkable foaming properties and excellent detergent and fat solvent properties. Laundry to be cleaned by the use of these materials is quickly wetted out.

Example 3

5 parts of 50% Turkey-red oil are clearly mixed with 5 parts 2,2-pentamethylen-4-oxymethyl-dihydrodioxol and then 3 parts mildly smelling well distilled middle fractionated benzine are added, a clear solution is obtained. By pouring it into water, an opalescent solution is arrived at, which already in the cold shows all the properties of a fat solvent washing agent. By using pure paraffin-oil instead of benzine stable emulsions are obtained.

Compositions having valuable washing, cleaning, wetting out and emulsifying properties may be prepared by incorporating a substituted dihydrodioxol with higher fatty acid salts, particularly the alkali metal salts, or with other materials having soap-like properties, and also properly termed "soaps" such as resinous and naphthenic acids or their salts, Turkey-red oil, and other organic sulfonic acids.

The soaps used in accordance with the teachings of the present invention are the water-soluble soaps, for example sodium and potassium salts of the higher fatty acids. The term "soap" as used throughout the claims, unless otherwise designated, is also intended to include those materials which have the characteristics of soaps and are considered by the art to be soaps. Such substances other than the salts of the higher fatty acids include the resinous, naphthenic, and organic sulfonic acid water-soluble salts.

I claim:

1. A washing, cleaning, wetting and emulsifying agent comprising a water-soluble soap together with a compound taken from the group consisting of 2,2 pentamethylene-4-oxymethyl-dihydro-dioxol, 2,2 methylpenta-methylene-4-oxymethyl-dihydro-dioxol and 2,2 dimethyl-4-oxymethyl-dihydro-dioxol.

2. A washing, cleaning, wetting and emulsifying agent comprising a water-soluble soap together with a compound taken from the group consisting of 2,2 pentamethylene-4-oxymethyl-dihydro-dioxol, 2,2 methylpenta-methylene-4-oxymethyl-dihydro-dioxol, 2,2 dimethyl-4-oxymethyl-dihydro-dioxol and water.

3. A washing, cleaning, wetting and emulsifying agent comprising a water-soluble soap together with a compound taken from the group consisting of 2,2 pentamethylene-4-oxymethyl-dihydro-dioxol, 2,2 methylpenta-methylene-4-oxymethyl-dihydro-dioxol, 2,2 dimethyl-4-oxymethyl-dihydro-dioxol, water and a hydrocarbon having solvent properties for fats.

4. A washing, cleaning, wetting and emulsifying agent comprising a water-soluble soap together with a compound taken from the group consisting of 2,2 pentamethylene-4-oxymethyl-dihydro-dioxol, 2,2 methylpenta-methylene-4-oxymethyl-dihydro-dioxol, 2,2 dimethyl-4-oxymethyl-dihydro-dioxol, water and an aromatic hydrocarbon having solvent properties for fats.

5. A foaming, emulsifying and detergent agent which comprises in aqueous solution a water-soluble soap and a substituted dihydro-dioxol having the following formula:

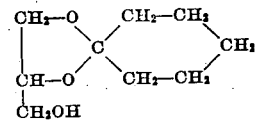

6. A foaming, emulsifying and detergent agent which comprises in aqueous solution a water-soluble soap and 2,2-methyl-pentamethylene-4-oxymethyl-dihydro-dioxol.

7. The product of claim 5 characterized in that a fat solvent selected from the group consisting of benzol, benzine and hydrogenated naphthalenes is incorporated in the solution.

8. The product of claim 6 characterized in that a fat solvent selected from the group consisting of benzol, benzine and hydrogenated naphthalenes is incorporated in the solution.

9. A detergent which comprises an aqueous solution of 2,2-pentamethylene-4-oxymethyl-dihydro-dioxol, potassium oleate and tetrahydronaphthalene.

10. A detergent which comprises an aqueous solution of coconut oil soap and 2,2-methyl-pentamethylene-4-oxymethyl-dihydro-dioxol.

11. A detergent which comprises an aqueous solution of Turkey red oil, 2,2-pentamethylene-4-oxymethyl-dihydro-dioxol and benzine.

WALTHER SCHRAUTH.